United States Patent [19]

MacFarlane

[11] Patent Number: 4,759,846
[45] Date of Patent: Jul. 26, 1988

[54] BACKWASHABLE FILTER

[75] Inventor: Anthony S. MacFarlane, Lightwater, England

[73] Assignee: The British Petroleum Company p.l.c., London, England

[21] Appl. No.: 93,119

[22] Filed: Sep. 2, 1987

Related U.S. Application Data

[63] Continuation of Ser. No. 859,909, May 5, 1986, abandoned.

[30] Foreign Application Priority Data

May 8, 1985 [GB] United Kingdom ................ 8511604

[51] Int. Cl.$^4$ ............................................. B01D 33/06
[52] U.S. Cl. ..................................... 210/393; 210/402; 210/427
[58] Field of Search ............... 210/784, 791, 797, 798, 210/326, 332, 333.01, 393, 402–404, 411, 427

[56] References Cited

U.S. PATENT DOCUMENTS 4,218,322  8/1980  Kojima ................................ 210/391
4,332,541  6/1982  Anders ................................ 425/197

FOREIGN PATENT DOCUMENTS 1031281  6/1958  Fed. Rep. of Germany .
1485989  of 0000  United Kingdom .

Primary Examiner—Frank Sever
Attorney, Agent, or Firm—Morgan & Finnegan

[57] ABSTRACT

A backwashable filter comprises (a) an outer case, (b) a rotatable, permeable filter drum, (c) a fibrous filter element supported on the surface of the drum, (d) one or more stationary backwash arms, (e) a feed inlet leading to one side of the filter drum and (f) a filter outlet emerging from the other side of the drum. The backwash arms are in close contact with the filter element. The tendency of the feedstock to bypass the filter and enter the backwash arms is thereby reduced.

4 Claims, 1 Drawing Sheet

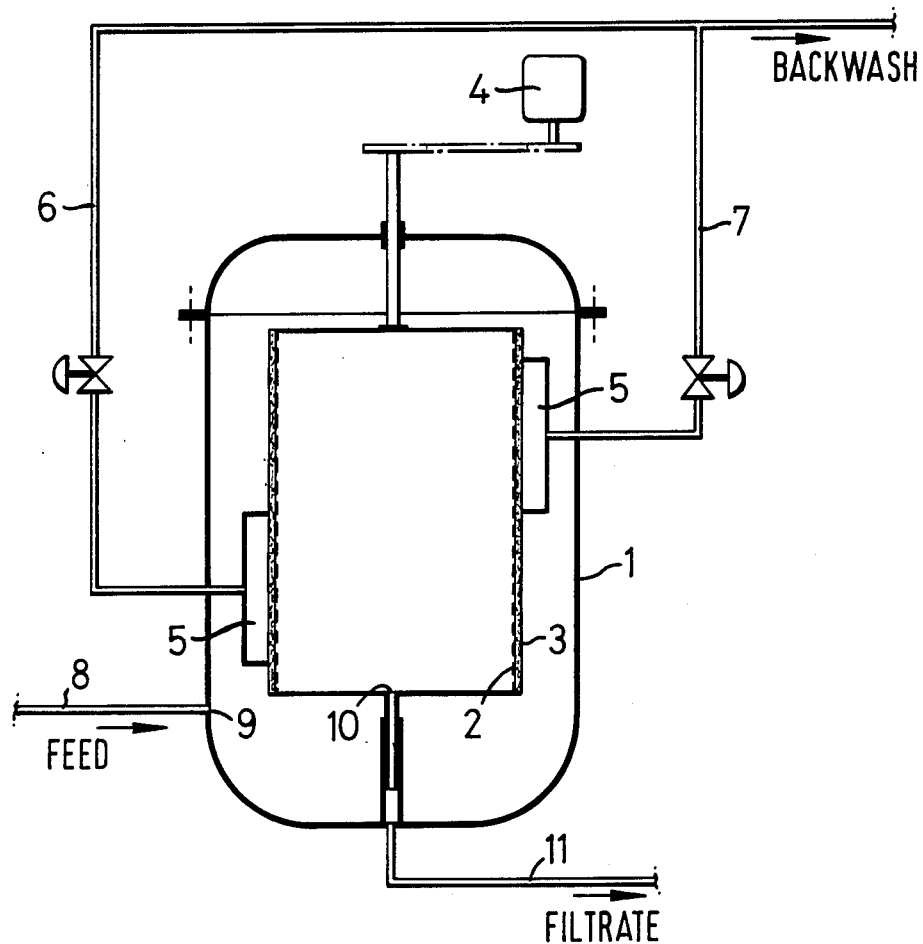

BACKWASHABLE FILTER

This ia a continuation of co-pending application Ser. No. 859,909, filed on May 5, 1986, now abandoned.

This invention relates to a backwashable filter.

It is frequently desired to remove solid particles from liquid streams by filtration, for example, from sea water prior to injection into an oil reservoir, from crude oil prior to separating the water in a coalescer and from oily water prior to separating the oil from the water in a coalescer. In use the filter becomes clogged with solids and it becomes necessary either to change the filter medium or to regenerate it, for example, by backwashing. Backwashable filters are described in British Patent Specifications Nos. 1,485,989 and 2,046,115A.

These specifications describe a type of filter containing a double-walled filter drum having a fibrous filter element positioned between the walls. Untreated liquid is introduced into the centre of the drum and forced radially outwards through the walls and filter element. Backwashing is achieved by rotating arms maintained under a relatively low pressure which sweep the inside of the drum and clean a section of the filter element at a time.

The efficiency of backwashing and also filtration depends on the provision of an effective seal between the rotating arms and the filter medium. This is difficult to achieve, partly because of the intervening drum wall. When a seal is not effective there is a tendency for liquid which should be filtered to bypass the seal, with the results that some of the feed escapes filtration and the full backwash potential is not realised.

We have now devised an improved type of drum filter which is less susceptible to this problem.

Thus according to the present invention there is provided a backwashable filter comprising (a) an outer case, (b) a rotatable, permeable filter drum, (c) a fibrous filter element supported on the surface of the drum, (d) one or more stationary backwash arms, (e) a feed inlet leading to one side of the filter drum and (f) a filtrate outlet emerging from the other side of the drum.

The fibrous filter element is preferably composed of synthetic polymer fibres, e.g. polypropylene, polyester or polyacrylonitrile. Most preferably the fibres are formed into a mat by the needle punch process.

Preferably the feed inlet leads to the outside of the filter drum, the filtrate outlet emerges from the interior of the drum, the filter element is on the outside of the drum and the backwash arm or arms bears or bear directly against the filter element.

Preferably at least two backwash arms are provided, each or all covering different areas of the filter element so that the whole element is swept in one rotation.

The backwash arms preferably terminate in sealing heads. These are preferably biassed against the filter element for improved sealing effect, e.g. by spring loaded telescopic arms, which compensate for basket irregularities. Where the duty warrants the expense, baskets made to fine tolerances allow the use of rigid arms.

In use, the feed liquid should flow radially inwards towards the centre of the filter drum. This has the effect of pressing the filter element against the drum and no support plate is necessary to prevent movement in the opposite direction, since there is none. This is in contrast to radial outward flow which tends to lift the filter element off the drum and renders a support plate necessary.

A further feature of the present invention is that the backwash arms are in close contact with the filter element. This element may be provided with a protective layer to prevent wear. The tendency of the feedstock to bypass the filter and enter the backwash arms is thereby reduced and wear on the arm heads is also reduced.

Since the backwash arms are stationary the control of liquid passing through them is relatively simple to arrange.

Individual control of selector heads is possible. This allows for enhanced cleaning in stringent applications. The total filter throughput is used to clean only a portion of the filter element at any given time.

The filtration area available in the preferred embodiment is increased for the same size of drum as that previously disclosed because of the absence of an outer wall and because the surface in contact with the feed is the outer surface rather than the inner surface of the filter element.

Furthermore, since there are no moving parts within the filter drum, accessibility and drum installation are simplified.

The invention is illustrated with reference to the accompanying drawing.

A backwashable filter comprises an outer shell 1 and a rotatable permeable filter drum 2 surrounded by a filter felt 3. The drum is rotated by a motor and gear box 4. Stationary backwash arms 5 bear against the filter felt 3 and backwash liquid is removed by lines 6 and 7.

The liquid to be filtered enters the filter through line 8 and inlet 9 under pressure, e.g. 6 bar, and passes through the filter felt 3 and into the interior of the drum 2, except in the vicinity of the backwash arms 5. There is a slight pressure drop across the filter felt, e.g. 0.5 bar. Filtrate is removed from the drum by outlet 10 and line 11.

A low pressure, e.g. 2 bar, is maintained in the backwash arms and therefore the pressure within the drum forces liquid through the filter felt in the reverse direction, thus dislodging and washing away contaminants.

The arm heads are narrow in relation to the overall circumference of the drum and at any given moment approximately 99.5% of the area of the filter felt is available for filtration and 0.5% is undergoing backwash.

By the selection of suitable felts this device can also be used as a coalescer or combined filter/coalescer for applications such as dewatering liquid hydrocarbons and de-oiling aqueous streams.

I claim:

1. A backwashable filter comprising: means for providing an improved backwash seal including an outer case encasing a permeable filter drum, a fibrous filter element supported on the outside surface of the drum, one or more stationary backwash arms forcibly bearing directly against the filter element and said drum, sufficient to provide a seal, a feed inlet leading through the outer case to the outside of the filter drum, a filtrate outlet emerging from the interior of the drum, and means for rotating the drum.

2. A backwashable filter according to claim 1 wherein at least two backwash arms are provided, each or all covering different areas of the filter element so that the whole element is swept in one rotation.

3. A backwashable filter according to claim 1 wherein the backwash arms terminate in sealing heads.

4. A backwashable filter according to claim 1 wherein the backwash arms are biassed against the filter element for improved sealing effect.

* * * * *